United States Patent [19]

Resetarits

[11] Patent Number: 5,098,615
[45] Date of Patent: Mar. 24, 1992

[54] MULTIPLE-DOWNCOMER CONTACTING TRAY WITH FLUID DIRECTING BAFFLES

[75] Inventor: Michael R. Resetarits, Depew, N.Y.

[73] Assignee: UOP, Des Plaines, Ill.

[21] Appl. No.: 600,636

[22] Filed: Oct. 19, 1990

[51] Int. Cl.$^5$ ............................. B01F 3/04; B01D 3/18
[52] U.S. Cl. ................................ 261/114.1; 202/158; 203/DIG. 24; 261/114.3
[58] Field of Search ............... 261/114.1, 114.3, 114.5; 202/158; 203/DIG. 24

[56] References Cited

U.S. PATENT DOCUMENTS

| | | | |
|---|---|---|---|
| 2,884,236 | 4/1959 | Maille | 261/114.3 |
| 3,282,576 | 11/1966 | Bruckert et al. | 261/114.3 |
| 3,410,540 | 11/1968 | Bruckert | 261/113 |
| 3,417,975 | 12/1968 | Williams et al. | 261/114.3 |
| 4,028,191 | 6/1977 | Scott | 202/158 |
| 4,101,610 | 7/1978 | Kirkpatrick et al. | 261/114.3 X |
| 4,311,564 | 1/1982 | Aldridge | 203/DIG. 24 |
| 4,328,177 | 5/1982 | Trager | 261/114.3 |
| 4,499,035 | 2/1985 | Kirkpatrick et al. | 261/114.3 |
| 4,582,569 | 4/1986 | Jenkins | 202/158 |
| 4,627,941 | 12/1986 | Bentham | 261/114.1 X |

FOREIGN PATENT DOCUMENTS 1212447  2/1986  U.S.S.R. ............... 261/114.3

OTHER PUBLICATIONS

Glitsch, Inc., "Ballast Tray Design Manual", Bulletin No. 4900—Fourth Edition, p. 33, 1974.

*Primary Examiner*—Richard L. Chiesa
*Attorney, Agent, or Firm*—Thomas K. McBride; John F. Spears, Jr.

[57] ABSTRACT

The performance of multiple downcomer type fractionation trays is stabilized against the effects of any rocking motion to which the surrounding column is subjected by the provision of vapor and liquid flow control baffles on the tray deck. One such baffle is perpendicular to the downcomers and extends upward. Vertical baffles are provided within and over the downcomers. A large number of bubble-promoting devices line the periphery of the tray.

12 Claims, 3 Drawing Sheets

MULTIPLE-DOWNCOMER CONTACTING TRAY WITH FLUID DIRECTING BAFFLES

FIELD OF THE INVENTION

The invention relates to the design and construction of vapor-liquid contacting apparatus. The invention therefore relates to apparatus used within gas scrubbing columns or fractional distillation columns to, for example, perform separations of volatile chemical compounds. The invention specifically relates to apparatus used as fractional distillation or contacting trays.

PRIOR ART

Vapor-liquid contacting trays are used in gas scrubbing or treating columns to remove a specific contaminant such as hydrogen sulfide. One specific type of vapor-liquid contacting tray is the fractional distillation tray. These trays are widely employed in the hydrocarbon processing, chemical, and petrochemical industries. Accordingly, a large amount of research, development, and creative thinking has been devoted to providing improved vapor-liquid contacting trays and especially fractionation trays. Entire texts are devoted to the subject. Fractionation tray development has therefore provided many variations in contacting area structure, downcomer design, and overall tray structure.

U.S. Pat. No. 3,410,540 issued to W. Bruckert is believed pertinent for its showing of the structure of a prior art "multiple downcomer" tray employing the highly distinctive downcomer design similar to that employed in the subject tray. This reference illustrates alternative downcomer designs and possible variations for sealing the downcomer outlet. FIG. 5 shows serpentine bracing means located within the downcomers (column 14, line 17).

The use of "anti-jump" baffles located above the inlet to downcomer is known in the art as illustrated by FIG. 10 in the ballast tray design manual issued by Glitsch Incorporated (Bulletin No. 4900—fourth edition, copyright 1974).

U.S. Pat. No. 4,028,191 issued to N. H. Scott is believed pertinent for its showing of a fractionation tray design in which vertical baffles descend from the lower surface of an upper fractionation tray. The baffles are employed on a cross-flow tray and oriented perpendicular to liquid flow across the tray. The baffles do not extend downward to the upper surface of the next lower tray.

Most trays have circular perforations evenly distributed across the contacting surface (decking) of the tray. These allow the rising vapor to flow straight upward from the tray's surface. A smaller subset of fractional distillation trays utilize mechanical means such as small "slot" in the tray surface for directing the vapor in a specified direction as it passes upward through the contacting area of the tray.

U.S. Pat. No. 3,282,576 to W. Bruckert et al. is believed pertinent for its showing of a cross flow tray having a receiving pan and a bubble promoting device. The reference also teaches that slots may be placed across the surface of a sieve-type liquid gas contacting tray to promote the flow of liquid across the tray without the aid of liquid gradients. U.S. Pat. No. 3,417,975 to B. Williams et al. is believed pertinent for its teaching of other variations in fractionation tray design such as variations in the tray or deck active area surface material. In this reference, the deck portion of the tray comprises both circular perforations and also flow directing slots. FIGS. 1-5 of this reference illustrate tray deck materials and perforation types which may be employed in the subject invention.

U.S. Pat. No. 4,499,035 issued to R. D. Kirkpatrick et al. is believed pertinent for its showing of the provision of froth initiation or bubble-promoting means at the liquid entrance to the tray deck area from the inlet downcomer. This reference appears to employ conventional downcomers and seal pans and provides a description of alternative designs for these tray elements.

BRIEF SUMMARY OF THE INVENTION

The invention is an improved multiple downcomer contacting tray, as opposed to the more widely used cross-flow tray, which provides highly stable performance during disturbances in fluid flow such as would be caused by lateral movement. In the invention three types of fluid baffles are located within the downcomers or upon the upper surface of the tray. Bubble-promoting devices are spread across the tray and located on the periphery of the tray. Two different types of bubble-promoters are preferably used.

One embodiment of the invention may accordingly be characterized as a vapor-liquid contacting tray having a generally circular circumference and comprising a disk-shaped vapor-liquid contacting deck having an upper first side and a lower second side, which deck is comprised of a perforated tray material; at least two trough-like downcomer means each formed by two opposing sidewalls and two end walls which are shorter than the side walls, with the sidewalls and end walls oriented perpendicular to the plane of the tray, each downcomer having a substantially open inlet located on the first side of the contacting deck and a liquid sealable outlet means located on the second side of the contacting deck; a plurality of liquid flow control baffles extending between opposing side walls of the downcomer means at spaced points along the sidewalls and being at least partially located within the downcomer means; a plurality of fluid flow control baffles which are substantially parallel to said sidewalls and extend away from said contacting deck upper first side beyond said downcomer means inlet, a fluid control baffle being associated with each downcomer means; a vapor flow control baffle which is substantially perpendicular to the contacting deck and extends across the first side of the contacting deck at an angle greater than 45 degrees from the downcomer means; and a plurality of bubble-promoting devices located on the contacting deck between and on each side of each downcomer means.

DETAILED DESCRIPTION

Figure 1:
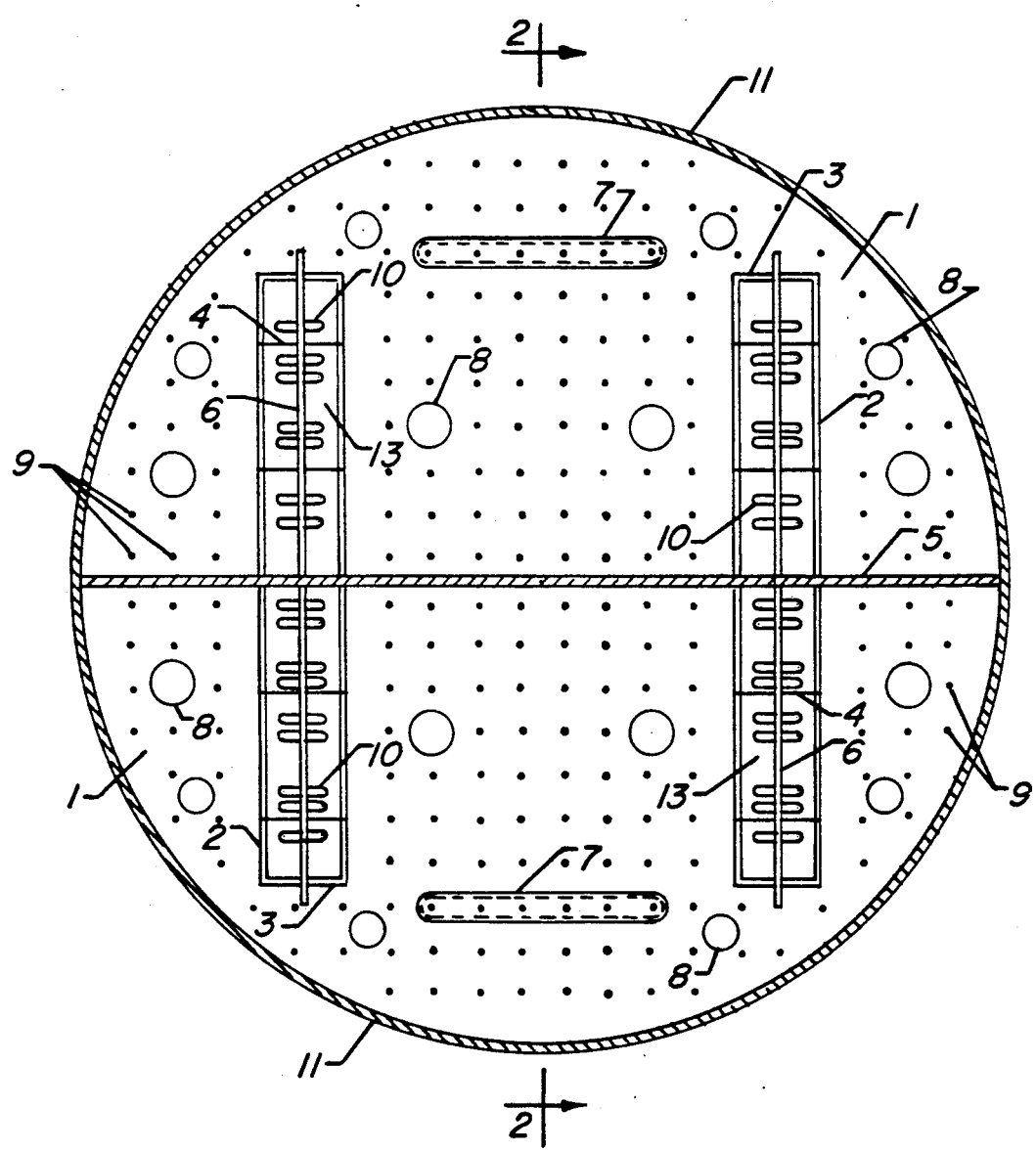
FIG. 1 is the view seen looking downward toward one embodiment of the subject fractionation tray. Two parallel downcomers are bisected by the vertical vapor control baffle 5.

Vapor-liquid contacting devices are used in a wide variety of applications for bringing into contact a liquid, which flows in a generally downward direction in the overall device, with a rising vapor stream. For instance, such devices are widely used to contact a gas stream with a treating liquid which selectively removes a product compound or an impurity from the gas stream. The subject apparatus can therefore be used in an acid gas absorber or stripper or in an ethylene oxide absorber. Another application of vapor-liquid contacting apparatus is in the separation of chemical compounds via fractional distillation. The apparatus of the subject invention can therefore be used in a variety of vapor-liquid contacting roles. The discussion herein is primarily in terms of use in a process for separation by fractional distillation, but this is not intended to in any way restrict the invention to that mode of operation.

The subject apparatus can be used in the separation of essentially any chemical compound amenable to separation or purification by fractional distillation. Fractionation trays are widely used in the separation of specific hydrocarbons such as propane and propylene or benzene and toluene or in the separation of various hydrocarbon fractions such as LPG (liquified petroleum gas), naphtha or kerosene. The chemical compounds separated with the subject apparatus are not limited to hydrocarbons but may include any compound having sufficient volatility and temperature stability to be separated by fractional distillation. Examples of these compounds are acetic acid, water, acetone, acetylene, styrene acrylonitrile, butadiene, cresol, xylene, chlorobenzenes, ethylene, ethane, xylenols, vinyl acetate, phenol, butane, butylenes, hexanes, halogenated hydrocarbons, aldehydes and alcohols.

In some applications, contacting columns are subjected to movement. For instance, the columns may be mounted on tethered offshore oil or gas production platforms for use in treating natural gas or recovered liquids. Petrochemical process units using fractionation columns can be mounted on barges moored near a source of natural gas production. The upper portion of tall contacting columns may also experience lateral movement in strong winds. In these or similar situations, the lateral or rocking motion of the supporting structure and column due to wave action can affect the performance of individual trays or the overall column. For instance, the sideways tilt of a column can result in the liquid level being unequal on different parts of the trays in the column. This affects vapor flow rates and tray efficiencies. Performance can be hurt because a high liquid level temporarily prevents upward vapor passage on a portion of the tray. The froth on this portion of the tray then dissipates, and this froth does not instantly reappear upon the return of a normal liquid level. As the column swings in the other direction, a reduced liquid level results on this same portion of the tray and inefficient contacting results. It is an objective of the subject invention to maintain effective vapor-liquid contacting when a contacting column is subjected to a rocking motion. It is a specific objective of the subject invention to provide a tray for use in a contacting column having a periodic swaying motion.

Before proceeding further with a description of the invention, it is useful to define and characterize the type of trade referred to herein as a multiple downcomer tray. A multiple downcomer tray is distinguished from the conventional crossflow tray by several structural characteristics. First, a multiple downcomer tray does not have a "receiving pan". This is the normally imperforated section located below an inlet downcomer opening. Reference is made to previously cited U.S. Pat. No. 4,499,035 to R. D. Kirkpatrick et al. which illustrates a receiving pan in FIGS. 1, 3 and 5. This is the imperforate space upon which the liquid descending through the downcomer impacts before passing onto the decking of the tray. Often the receiving pan is separated from the decking or "active" area of the tray by an inlet weir. Receiving pans are therefore normally located directly below the downcomer leading from the next above conventional cross-flow fractionation tray.

Multiple downcomer fractionation trays do not have receiving pans. That is, the horizontal surface area of a multiple downcomer fractionation tray is basically divided into downcomer means and vapor-liquid contacting area normally referred to as the deck or decking portion of the tray. There are no imperforate areas allocated to receiving descending liquid from the tray located immediately above.

Another distinguishing feature of multiple downcomer fractionation trays is the provision of a relatively large number of parallel trough-like downcomer means across the tray. These downcomer means are spaced relatively close together compared to the downcomers of most customary crossflow fractionation trays. The distance between adjacent downcomers of the same tray will normally be less than one meter and will often be less than 0.5 meter. This results in the multiple downcomer tray having a unique design when viewed from above consisting of the alternating decking areas and downcomer means evenly spaced across the upper surface of the fractionation tray, as for instance shown in FIG. 1.

The downcomer means of a multiple downcomer tray are also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the top or inlet to the downcomers of the tray below. The top or inlet to the downcomer of a tray often functions as the outlet weir of the tray. Therefore the bottom of the downcomer of the next above multiple downcomer is well above the outlet weir of the tray located below.

Downcomers on a multiple downcomer tray are normally oriented at 90 degrees from the trays located immediately above and below. The downcomers on vertically adjacent multiple downcomer trays are therefore perpendicular rather than parallel.

Yet another distinguishing feature of multiple downcomer fractionation trays is the provision of a liquid sealable means in the bottom or outlet of the downcomer means. The bottom of the downcomer means is therefore partially closed off by a plate having various perforations or by some other means intended to retard the direct downward flow of liquid out of the downcomer means. Reference is made to the detailed description of the Drawing and the cited references for further information on this. This liquid sealable outlet is located well above the deck of the tray located immediately below and is at a point above the inlet of the downcomers associated with this next lower tray. The descending liquid is collected in the lower portion of the downcorner means and spills forth upon the next lower tray through these openings or other mechanical arrangement.

Figure 2:
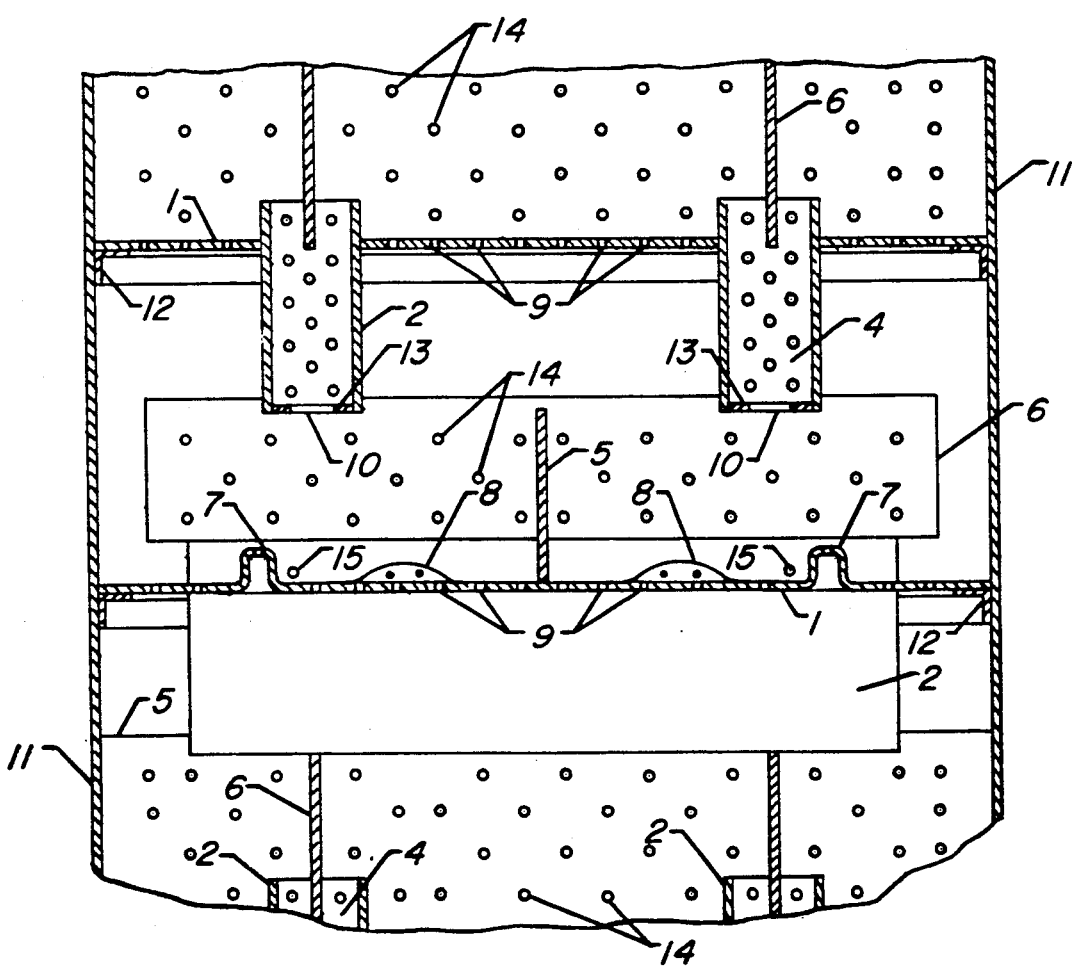
FIG. 2 is a cross-sectional view taken on a vertical plane through a fractional distillation column 11 employing two trays having the structure shown in FIG. 1.

There is no inlet weir at the bottom of the downcomer of the subject trays as in a cross-flow tray. The liquid sealable outlet performs this function. Reference is made to FIG. 2 which shows a perforated plate arrangement as the liquid sealable outlet. Variations in downcomer outlet design are shown in the previously cited U.S. Pat. No. 3,410,540 issued to W. Bruckert, which is incorporated herein in its entirety for guidance in tray design and construction.

Multiple downcomer means are characterized by a very short liquid path between the point at which the liquid first contacts the tray and the point at which the liquid exits the tray via the downcomer means. This is due primarily to the close spacing of the downcomers as described above. This short distance coupled with the agitation attendant with the passage of vapor upward through the decking portion of the tray results in multiple downcomer trays having essentially no liquid gradient from the liquid inlet to exit points.

The long outlet weir of multiple downcomer trays results in low froth heights. These low froth heights allow these trays to operate at lower pressure drops than conventional trays. Since the multiple downcomer tray pressure drop is less, the downcomer height required to provide an acceptable downcomer safety margin is less. The multiple downcomer trays can operate at very close tray spacings. Tray spacings of 300-400 millimeters are typical for multiple downcomer trays.

The reduced tray spacing provides some advantages. For a revamp, more trays can be placed in a given section (e.g., a 3-for-2 revamp where every two existing trays are replaced by three new trays). This can generate more theoretical trays and hence provide a better separation. For a new (or grass roots) column, lower tray spacings decrease the column's height. This could aid in the transportation and erection of the column. Also, since multiple downcomer trays are capable of handling higher loadings than conventional trays, they can be used to provide more flow through a given diameter in a revamp situation or reduce the column diameter in a grass roots application.

The physical size of any portion of a multiple downcomer tray must be chosen by a skilled designer considering all aspects of the intended operation of the tray. The following are measurement ranges of commercially employed multiple downcomer trays which are presented for the dual purposes of providing guidance in the design and use of the subject apparatus and for distinguishing the multiple downcomer trays of the subject invention from the conventional cross-flow fractionation tray. The spacing between vertically adjacent trays would normally be between 20 and 91 centimeters (8-36 inches) and is preferably between 25-61 centimeters (10-24 inches).

The total open area of the deck is generally in the range of about to about 5 to 15 percent of the deck area. This includes the open area provided by both circular openings and any elongated slots on the deck area of the tray. The normal hole diameter of the circular perforations may range from about 0.3 to about 2.6 centimeters ($\frac{1}{8}$-1.0 inches). A hole size of about 0.47 to about 0.64 centimeters (3/16-$\frac{1}{4}$ inch) is normally preferred. If slots are employed, the open area provided by slots is preferably from about 0.25 to about 5 percent of the area of the deck. A representative thickness of the decking is about 0.19 centimeters (0.075 inches) to 0.34 cm. The inlet openings of the downcomers are normally about 6 to about 25 cm wide (2.5-10 inches). The height of a downcomer as measured from the horizontal top edge of the outlet weir to the bottom of the liquid sealable means is normally between about 15.2 to about 45.7 centimeters (6-18 inches). This includes the height that the downcomer extends above the decking and below the decking. The fluid flow control baffle located above the downcomer would normally be at least 7.5 centimeters tall and maybe up to 35.6 centimeters in height (3-14 inches) and will normally be approximately equal in length to the associated downcomer means. Again, further information on the arrangement and variations of the elements of a multiple downcomer tray may be obtained by reference to U.S. Pat. No. 3,410,540.

To facilitate an easier identification of the three different types of baffles used in the subject tray, they are referred to herein as liquid, vapor or fluid control baffles. This is believed preferably to such nomenclature as first, second and third baffles. This nomenclature is however not intended to definitively characterize the fluids which these baffles contact. For instance the liquid flow control baffles located in the downcomers will contact entrained vapor bubbles and the bottom portion of the vapor flow control baffle may be immersed in mainly liquid phase media.

The agitation which occurs upon the decking and any rocking motion of the column can cause erratic and sometimes very powerful horizontal movement of suspended liquid droplets. It is therefore preferred that fluid control or "anti-jump" baffles be placed over the inlet of the downcomer means in order to prevent the passage of liquid across the inlet to the downcomer. It is the function of the fluid control baffle to intercept both liquid and vapor passing horizontally over the downcomer inlet and to direct liquid into the downcomer. Basically the anti-jump baffle absorbs the horizontal momentum of the fluid which may otherwise carry it over the baffle and allows the liquid to fall by the action of gravity into the downcomer inlet. The provision of the fluid flow control baffles and other components of the subject invention has been found to be a positive enhancement to the structure of the tray and useful in achieving the objectives of the invention.

A more complete understanding of the subject invention may be obtained by reference to the drawings. FIG. 1 shows the view seen looking downward toward the upper surface of a multiple downcomer tray constructed according to the subject invention. The particular tray represented in this drawing has two downcomers and a cylindrical outer edge which would abut the inner wall of a fractionation column. Each downcomer means is comprised of two downcomer end walls 3 and two parallel side walls 2.

One of the most prominent features of the tray, when viewed from above, is the deck 1 composed of any form of suitable vapor-liquid contacting tray material such as normally employed on fractionation or vapor-liquid contacting trays. The deck may consist of a flat sheet of metal having relatively uniformly spaced circular perforations. Alternatively, the deck may have perforations in some other shape such as elongated slots or openings formed by raising a portion of the tray material on one side of a slit formed in the tray material such that the opening of the slot has a covering portion formed from the raised and bent tray material. This type of opening is often referred to as a vapor-directing or flow-directing type device since the upward traveling gases will exit the opening traveling at an angle to vertical. It is preferred that deck of the subject apparatus has such flow directing slots and that the slots have their openings directed toward the nearest downcomer. It is highly preferred that the deck contain both circular perforations and flow directing slots.

As another alternative structure or the deck, the tray material described in U.S. Pat. No. 4,328,177 may be used. This comprises narrow tapered rods which are welded to perpendicular connecting support members.

The tray shown in FIG. 1 has two downcomer means spaced in parallel arrangement along opposing sides of the tray. The downcomer means are formed in part from the sidewalls 2 and the end walls 3. Downcomers are in the form of a trough-like or box-like open topped enclosure which extends above the upper surface of the tray deck 1 and also extends a further distance below the tray deck. The downcomers are normally square at the end and thus have an overall rectangular shape. There is, however, no requirement for this and the ends of the downcomer could be slanted to run along the edge of the tray or could be curved concentric with the edge of the tray.

The bottom of the downcomer is closed by an attached plate 13 having perforations 10 which allow for the exit of liquid. In this view, the perforations 10 are in the form of elongated openings spaced along the bottom surface of the downcomer. The openings 10 could take other forms such as substantially uniformly spaced circular openings or groups of circular openings along the length of the downcomer. The bottom of the downcomer may also have alternative configurations as shown in the above-referenced prior art.

To better accommodate any rocking action, the open area of the perforations of both the deck and the bottom of the downcomer are held to the lower portion of suitable open areas. On the deck this helps to control weeping on the low (high liquid level) side of the tray. In the downcomer this helps control liquid flow, and hence distribution to the next tray, on the high side of the tray. It is desired to keep liquid within all parts of the bottom of the downcomer. This also prevents vapor from passing upward through the downcomer.

Another major feature of the subject tray is the vapor-flow control means represented by the baffle 5 which extends across the tray perpendicular to the downcomer means. The baffle 5 extends from the upper surface of the deck 1 upward to a level which would be in close proximity to the bottom surface of the downcomer located immediately above. The height of the vapor flow control baffle 5 is therefore set by the intended tray spacing within the column in which the tray is employed.

The vapor flow control baffle is preferably perforated. Two or more flow control baffles could be employed instead of the single baffle shown in the drawing. On wide trays the use of multiple baffles becomes more advantageous. The orientation of the vapor flow control baffle shown in the drawing is preferred but is not believed to be essential. The baffle(s) could therefore be inclined at an angle from vertical or from the downcomers. The angle between this baffle and the sidewall of the downcomers is preferably greater than 45 degrees. There is also no requirement that the vapor flow control means be monolithic. It could be formed from several smaller perforated plates to facilitate installation, repair and inspection. The vapor flow control means may have small symmetrical openings uniformly spaced across its surface or other types of openings such as slits extending the height of the baffle. The baffle may be formed from the same material as the tray deck, but is preferably more porous. This means could also comprise two or more parallel plates or a mesh blanket.

The downcomers themselves have a unique arrangement in that they have two separate baffling means provided to reduce horizontal fluid movement. First of all, there are provided the shorter baffles 4 which are intended primarily to control liquid movement and to prevent sloshing of liquid or the liquid-bubble admixture typically found in the top portion of a downcomer. The baffles 4 extend between the side walls 2 of the downcomer. Preferably they are attached to each side wall and are perpendicular to the side wall. The baffles 4 may also be aligned at an angle other than 90 degrees to the sidewall or could be curved or have a definite shape other than the flat plate shown in the drawings. The baffles 4 preferably extend downward within the internal cavity of the downcomer means and may also extend slightly above the open upper end of the downcomer. The structure of the baffle 4 is actually better seen by reference to FIG. 2. These baffles may be imperforate but are preferably perforated. The baffles can be formed from expanded metal or by metal plates having a large number of perforations. The open area of these baffles is preferably between 30 and 50 percent. The distance between baffles is preferably less than 0.6 meters.

The third baffle means employed in the subject apparatus is the fluid control or anti-jump baffle 6 referred to above. As shown in FIG. 1 this baffle is preferably centrally located above the open upper end of the downcomer. The baffle 6 preferably extends between the two ends of the downcomer. This baffle may extend into the downcomer or may be located entirely above the downcomer. This baffle may be on the order of about one-half to one and one-half times the height of the downcomer as measured by the height of the sidewall. The fluid flow control baffle 6 may be imperforate, but it is highly preferred that both baffles 5 and 6 are highly perforated. They are preferably formed from "expanded metal" having an open area of about 50-60 percent. The open area of the expanded metal is customarily the result of prepunching one-inch slits, with the metal then being expanded to about 150 percent of its former surface area.

Two other significant features of the subject apparatus shown on FIG. 1 are the bubble-promoting devices 7 and 8 distributed across the surface of the tray. The bubble-promoting or bubble-initiating devices are of two different kinds. The box-like structure 7 is shown in detail cross-section in FIG. 3. The dome-shaped bubble-promoting device 8 is shown in greater detail in FIG. 4. The bubble-promoting devices are preferably concentrated along the edge or the periphery of the overall tray. The box-like devices 7 are located between the two downcomers, with the dome-shaped bubble promoters being distributed along the edge and also across the tray. In one highly thought of alternative, box-like promoters are used in place of the dome-shaped bubble initiators located on the extremities of the column between the downcomer means and the edge of the tray. This arrangement would require at least four box-like bubble promoters plus at least four, and preferably, at least eight dome-like bubble promoters located on the tray. The bubble promoters serve to maintain activity when the liquid level on this part of the tray is high.

Referring now to FIG. 2, there is seen a cross-sectional view looking across a fractionation column employing two of the subject fractionation trays of FIG. 1 but which in other ways is normal in design and operation. The perforations shown are not to scale and are present only to represent the preferably more perforated nature of the tray deck. An important observation which may be made upon examination of FIG. 2 is that there is no imperforate receiving pan on the deck or surface of the fractionation tray. Rather the upper side of the fractionation tray is essentially covered by the perforate tray material and the downcomer means. In this view the relatively flat or planar structure of the deck 1 and the open-top box-like nature of the downcomer means is more readily apparent. The tray itself is supported within the column by the L-shaped ring or lip 12 attached to the inner surface of the wall 11 of the fractionation column. A significant, e.g. 1.5 cm, opening 15 is preferably provided at the ends of the downcomer sidewalls to allow liquid to enter the downcomer before normal liquid levels are reached.

The liquid flow control means comprising baffles 4 extends downward a considerable distance into the downcomer means. In the embodiment shown in the drawing these baffles extend to the bottom of the downcomer. They could end at any point over 60 percent below the upper open end of the downcomer. The baffles preferably extend to the bottom of the downcomer. In this embodiment, the bottom of the downcomer is enclosed by a flat seal plate 13 having the elongated openings 10 spaced therein as shown in FIG. 1. The fluid flow control baffle 6 extends upward from the downcomer, with preferably the majority of the baffle 6 being located above the open upper end or inlet of the downcomer. In a highly preferred embodiment over 85 percent of the baffle 6 is located above the downcomer. The baffle 6 preferably extends upward to the bottom of the immediately above downcomer but could end at a lower level. The baffle 6 can extend laterally beyond the end walls of the downcomer and could, if desired, extend to the wall 11 of the column.

FIG. 2 is illustrative of the relative proportion of the downcomer which is located above and below the surface of the deck 1. Normally at least three-quarters of the total height of the downcomer, as measured by the height of the sidewalls, is located below the tray deck. Although FIG. 2 is not to scale, it is representative of approximate proportions which may be used. For example, the total downcomer could be about 23 centimeters high, with 5 centimeters of the wall being located above the deck surface. The height of baffle 6 would then be, in this example, about 15 centimeters and the tray spacing would be about 38 centimeters. The baffle 5 would be about 20 centimeters high. Other distances would be used in other examples depending upon the overall tray spacing, etc. which basically depends on the compounds being separated and operating conditions.

As used herein, the terms above and below are in reference to the flat planar surface of the deck 1 when the tray is in the normal orientation for use in an operating fractionation column. That is, the deck 1 would be horizontal with the inlet openings of the downcomer means being visible when viewed from above.

FIG. 2 is also illustrative of the significant relative height of the vapor flow control baffle 5. This baffle preferably extends from the upper surface of a tray to at least the level of the top of the fluid flow control baffles 6. Therefore, if for instance the downcomer wall extends five centimeters above the deck surface, and the baffle 6 extends 15 centimeters above the downcomer wall then the baffle 5 would extend at least 20 centimeters above the deck surface. The baffle 5 preferably extends upward to the bottom of the downcomers on the next higher tray. The top portion of baffle 5 may therefore be between the downcomers of the next higher tray. The baffle 5 could extend upward to within close proximity of the lower surface of the next above tray. It is not necessary that the baffle 5 touch the next above tray or that a seal is formed between the baffle 5 and the next above tray. It is preferred that the baffle 5 have a height equal to at least 30 percent of the tray spacing height, that is the distance between adjacent trays. More preferably, the baffle 5 extends at least 40 percent of the tray spacing height.

Figure 3:
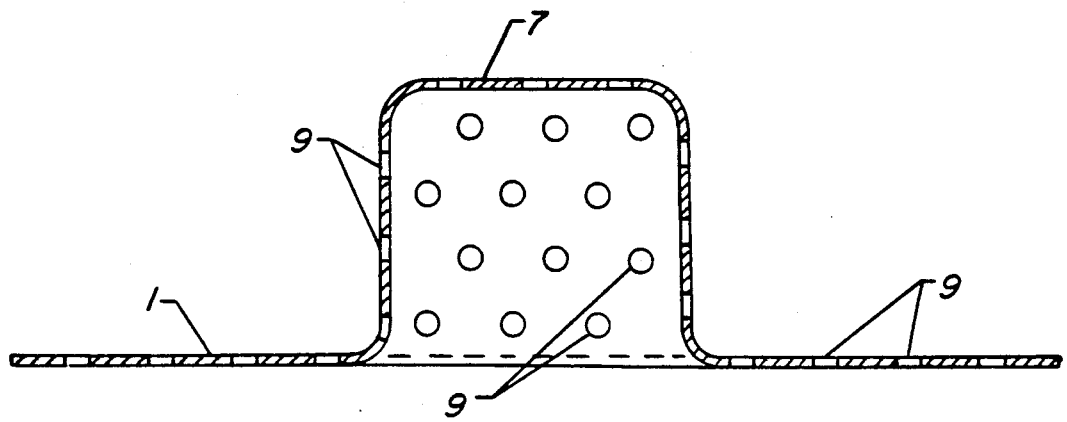
FIG. 3 is a vertical cross-sectional view of a box-shaped, bubble-promoting device 7 shown in FIG. 1.

FIG. 3 is a cross-section taken through a box-like bubble-promoting device as employed upon the deck surface of the subject fractionation tray. FIG. 3 is not drawn to scale. The device is preferably at least 2.5 centimeters high measured from the tray deck. They may be from about 25 to about 75 centimeters long. This cross-sectional drawing shows the multitude of perforations 9 located in the surface of the deck material and the bubble-promoting device. Also the general rectangular or box-like structure of the bubble-promoter 7 may be seen from this drawing.

Figure 4:
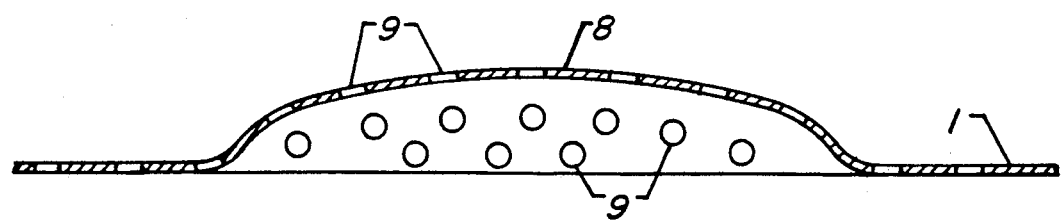
FIG. 4 is a vertical cross-sectional view of a dome-shaped, bubble-promoting device 8 shown on FIG. 1.

FIG. 4 illustrates a dome-shaped bubble-promoting device which again is not drawn to scale. The multiple perforations provided in the decking material 1 and the overall shape of the bubble-promoter 8 is shown by the drawing.

The box-like bubble promoters would be on the order of 1.5 inches (2.5-3.8 centimeters) high. The dome-like bubble promoter devices 8 may be on the order of from 2 to 4 inches (5.1-10.2 centimeters) in diameter and approximately 1 inch (2.5 centimeters) high when measured from the deck surface.

One embodiment of the subject invention may accordingly be characterized as a tray useful in the fractional distillation of chemical compounds, comprising: a perforated tray deck having a planar upper first surface and a lower second surface; a plurality of multiple downcomer means spaced in parallel arrangement across the tray deck, each downcomer means having a first portion and an associated inlet located on the first side of the tray deck and a larger second portion located on the second side of the tray deck and having a liquid-sealable outlet located on the second side of the tray deck; and fluid flow control means comprising (1) a fluid flow control baffle extending away from the first side of the tray deck to a greater distance than the downcomer means and centrally located above the inlet to each downcomer means; (2) a plurality of liquid flow control baffles at least partially located within said downcomer means and connecting opposing walls of the downcomer means (3) at least one vapor flow control means comprising a perforated baffle located on the first side of the tray deck and extending away from the tray deck to a greater distance than the fluid control baffle, said perforated baffle being substantially perpendicular to both the downcomer means and the tray deck. The tray, in differing embodiments, can have one, two, three, four or five or more individual downcomers.

A more inclusive embodiment of the invention comprises a vapor-liquid contacting apparatus comprising an enclosed cylindrical outer vessel having a plurality of the subject trays mounted therein, with the vertically adjacent trays (and therefore downcomers) being perpendicular to each other. The overall apparatus would include the customary accessories for feeding the liquid and vapor streams to be contacted such as a reboiler and reflux system.

What is claimed:

1. A vapor-liquid contacting tray having a generally circular circumference and comprising:
   (a) a disk-shaped vapor-liquid contacting deck having an upper first side and a lower second side, said deck being comprised of a perforated tray material;
   (b) at least two trough-shaped downcomer means each formed by two opposing sidewalls and two end walls which are shorter than the side walls, with the sidewalls and end walls oriented perpendicular to the plane of the tray, each downcomer having a substantially open inlet located on the first side of the contacting deck and a liquid sealable outlet means located on the second side of the contacting deck;
   (c) a plurality of liquid flow control baffles extending between opposing side walls of the downcomer means at spaced points along the sidewalls and being at least partially located within the downcomer means;
   (d) a plurality of fluid flow control baffles which are substantially parallel to said sidewalls and extend away from said contacting deck upper first side beyond said downcomer means inlet, with one of said fluid control baffles being positioned between said sidewalls of each downcomer means;
   (e) a vapor flow control baffle which is substantially perpendicular to the contacting deck and extends across the first side of the contacting deck at an angle greater than 45 degrees from the downcomer means; and
   (f) a plurality of bubble-promoting devices located on the contacting deck between the downcomer means.

2. The tray of claim 1 wherein the vapor flow control baffle is substantially perpendicular to the downcomer means.

3. The tray of claim 1 wherein the fluid control baffle is attached to and supported by the liquid flow control baffles.

4. The tray of claim 1 wherein the liquid flow control baffles extend outward from the inlet of the downcomer means.

5. The tray of claim 1 wherein the bubble-promoting devices comprise a pair of box-shaped bubble-promoting devices located between and perpendicular to two downcomer means.

6. The tray of claim 5 wherein the bubble-promoting devices further comprising domed bubble-promoting devices located between and on each side of the downcomer means.

7. The tray of claim 1 wherein the liquid flow control baffles are imperforate.

8. The tray of claim 1 wherein the liquid flow control baffles and the vapor flow control baffle are perforated.

9. A fractional distillation column comprising a plurality of the vapor-liquid contacting trays according to claim 1 enclosed within a cylindrical outer vessel.

10. A fractional distillation tray comprising:
    (a). a perforated tray deck having a planar upper first surface and a lower second surface;
    (b). a plurality of multiple downcomer means spaced in parallel arrangement across the tray deck, each said downcomer means having a first portion and an inlet located on the first side of the tray deck and a larger second portion and a liquid-sealable outlet located on the second side of the tray deck;
    (c). fluid flow control means comprising:
       1. a fluid flow control baffle extending away from the first side of the tray deck to a greater distance than the downcomer means and centrally located above the inlet to each downcomer means;
       2. a plurality of liquid flow control baffles at least partially located within said downcomer means and connecting opposing walls of the downcomer means;
       3. at least one vapor flow control means comprising a perforated baffle located on the first side of the tray deck and extending away from the tray deck to a greater distance than the downcomer means, said perforated baffle being substantially perpendicular to both the downcomer means and the tray deck.

11. The tray of claim 10 wherein bubble-promoting devices are located along the periphery of the tray.

12. The tray of claim 11 wherein the fluid flow control baffles are perforated.

* * * * *